US007680826B2

United States Patent
Imai

(10) Patent No.: US 7,680,826 B2
(45) Date of Patent: Mar. 16, 2010

(54) COMPUTER-READABLE RECORDING MEDIUM STORING SECURITY MANAGEMENT PROGRAM, SECURITY MANAGEMENT SYSTEM, AND METHOD OF SECURITY MANAGEMENT

(75) Inventor: Yuji Imai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 136 days.

(21) Appl. No.: 11/452,897

(22) Filed: Jun. 15, 2006

(65) Prior Publication Data

US 2007/0226256 A1 Sep. 27, 2007

(30) Foreign Application Priority Data

Mar. 10, 2006 (JP) .............................. 2006-065410

(51) Int. Cl.
G06F 17/30 (2006.01)
(52) U.S. Cl. .................... 707/104.1; 707/3; 707/100; 707/9; 726/25
(58) Field of Classification Search .................. 726/25
See application file for complete search history.

(56) References Cited

U.S. PATENT DOCUMENTS

2002/0174349 A1* 11/2002 Wolff et al. ............... 713/188
2004/0010786 A1* 1/2004 Cool et al. ................ 717/170
2004/0221176 A1* 11/2004 Cole ........................ 713/201
2005/0132206 A1* 6/2005 Palliyil et al. ............. 713/188
2006/0259974 A1* 11/2006 Marinescu et al. .......... 726/25
2007/0016948 A1* 1/2007 Dubrovsky et al. ......... 726/22
2007/0107043 A1* 5/2007 Newstadt et al. ............ 726/2

OTHER PUBLICATIONS

Patent Abstracts of Japan, Publication No. 2003-208325, Published Jul. 25, 2003.

* cited by examiner

Primary Examiner—Cam Y T Truong
(74) Attorney, Agent, or Firm—Fujitsu Patent Center

(57) ABSTRACT

A security management program coping with a security hole found in a library. When a request for executing jobs, including a job program, is input, a service library-determining section analyzes the job program and determines link libraries called by the job program. Then, a job submission section transmits the job program to submission destination nodes, and instructs the submission destination nodes to execute the jobs according to the request. After that, when identification information for identifying a vulnerable library having a security defect is input, a submission destination-determining section obtains identification information for identifying the job program corresponding to the vulnerable library, and identification information for identifying the submission destination nodes corresponding to the job program. Subsequently, a forcible job stop section instructs the submission destination nodes to stop processes for executing the job program.

10 Claims, 14 Drawing Sheets

210 SECURITY DATABASE

| LIBRARY NAME | VERSION | RISK |
|---|---|---|
| LIBRARY #1 | Ver. 1. 1 | GREAT |
| LIBRARY #5 | Ver. 2. 0 | MEDIUM |
| LIBRARY #8 | Ver. 1. 0 | SMALL |
| ⋮ | ⋮ | ⋮ |

FIG. 5

111 SERVICE LIBRARY MANAGEMENT DATABASE

| PROGRAM NAME | USE LIBRARY NAME | VERSION |
|---|---|---|
| PROGRAM A | LIBRARY #1 | Ver. 1. 1 |
| | LIBRARY #2 | Ver. 2. 0 |
| | LIBRARY #3 | Ver. 2. 5 |
| ⋮ | ⋮ | ⋮ |

FIG. 6

112 JOB SUBMISSION DESTINATION MANAGEMENT DATABASE

| PROGRAM NAME | DISTRIBUTION DESTINATION NODE NAME | IP ADDRESS |
|---|---|---|
| PROGRAM A | Node#1 | ADDRESS #1 |
| | Node#2 | ADDRESS #2 |
| | Node#3 | ADDRESS #3 |
| ⋮ | ⋮ | ⋮ |

FIG. 7

COMPUTER-READABLE RECORDING MEDIUM STORING SECURITY MANAGEMENT PROGRAM, SECURITY MANAGEMENT SYSTEM, AND METHOD OF SECURITY MANAGEMENT

CROSS-REFERENCE TO RELATED APPLICATIONS

This application is based upon and claims the benefits of priority from the prior Japanese Patent Application No. 2006-065410 filed on Mar. 10, 2006, the entire contents of which are incorporated herein by reference.

BACKGROUND OF THE INVENTION

1. Field of the Invention

This invention relates to a computer-readable recording medium storing a security management program for ensuring security during execution of jobs, a security management system, and a method of security management, and more particularly to a computer-readable recording medium storing a security management program for ensuring security during execution of a job input from another apparatus, a security management system, and a method of security management.

2. Description of the Related Art

A grid system is employed in a large number of companies so as to perform a large amount of calculation by parallel processing. The grid system is comprised of a plurality of nodes (computers for executing jobs) connected via a network, and divides and allocates processing to be executed to the nodes to cause them to perform parallel processing.

In the grid system, a number of computers are connected via a network for operation. Therefore, if one of the computers is infected with a virus, or illegally intruded from outside by attack on a security hole therein, the security of the whole network is jeopardized. To overcome this problem, a technique of ensuring the security of individual computers is necessitated.

As the technique of ensuring the security of a plurality of computers, there has been proposed a technique, for example, which causes a moving object to travel between the computers and inspect infection by a computer virus. In this technique, when infection by a computer virus is detected by the moving object, it is possible to stop communication between the infected computer and the other computers (see e.g. Japanese Unexamined Paten Publication No. 2003-208325).

By the way, in many cases, users of the conventional grid system are advanced researchers. Therefore, almost all part of a program submitted to the system is specially written in a manner adapted to a use of computation as a purpose peculiar to the program. On the other hand, due to the widespread use of the grid system, it is expected that processes of programs, which are commonly used by the programs for various purposes of computation, come to be provided as libraries. The library is a program which describes a process commonly performed between a plurality of programs describing operations of different tasks. For example, a process for covariance matrix computation, a process for communication between grid nodes, a process for database operations, and so forth are often commonly usable between the programs. In such cases, it is possible to provide these processes as libraries.

When libraries are used in a large number of programs, if a security hole is found in any of them, all the nodes in which the programs are operating are at risk. To cope with this inconvenience, it is necessary to quickly eliminate the security hole.

Libraries have been rarely used in the grid system, with no serious security holes having been found in the libraries hitherto, and hence this problem has not been obvious. When libraries come to be widely used in the future, there is a possibility that there may be unexpectedly found a security hole, and it becomes a target of attack. In such a case, all the grid nodes in which programs linked to the libraries are being executed can be at risk. Thus potential threats also come to increase.

In the current grid system, however, it is not considered to cope with the above threats quickly and exhaustively, so that potential threats remain to exist. It should be noted that in the technique disclosed in the aforementioned publication, when a computer is infected with a virus, the virus cannot be detected until the moving object patrols the computer, which is insufficient in respect of quickness in coping with the threat.

SUMMARY OF THE INVENTION

The present invention has been made in view of these problems, and an object thereof is to provide a computer-readable recording medium storing a security management program which is capable of quickly coping with a security hole in a library when it is found out, a security management system, and a method of security management.

To attain the above object, in a first aspect of the present invention, there is provided a computer-readable recording medium storing a security management program for performing security management of a job submitted via a network. The security management program is characterized in that a computer is caused to function as a service library management database for storing associations between a job program describing processes of the job, and link libraries called by the job program, a job submission destination management database for storing associations between the job program, and job submission destination nodes to which the job has been submitted, job execution request-obtaining means for receiving input of a job execution request including the job program, service library-determining means for analyzing the job program obtained by the job execution request-obtaining means, determining the link libraries to be called by the job program, and registering associations between identification information for identifying the job program and identification information for identifying the link libraries in the service library management database, job submission means for determining submission destination nodes which are to be caused to execute the job program obtained by the job execution request-obtaining means, registering identification information for identifying the submission destination nodes and the identification information for identifying the job program in association with each other in the job submission destination management database, and transmitting the job program to the submission destination nodes for causing the submission destination nodes to execute the job program, submission destination-determining means operable when identification information for identifying a vulnerable library having a security defect is input, to refer to the service library management database to thereby obtain the identification information for identifying the job program corresponding to the identification information for identifying the vulnerable library, and refer to the job submission destination management database to thereby obtain the identification information for identifying the submission destination nodes corresponding to the obtained identification information for identifying the job program, and forcible job stop means for instructing the submission destination nodes to stop processes for executing the job program, based on the identification information for identifying the job program and the identification information for identifying the submission destination nodes, which are obtained by the submission destination-determining means.

Further, to attain the above object, in a second aspect of the present invention, there is provided a security management system for carrying out security management of a job submitted via a network. The security management system comprises a service library management database for storing associations between a job program describing processes of the job, and link libraries called by the job program, a job submission destination management database for storing associations between the job program, and job submission destination nodes to which the job has been submitted, job execution request-obtaining means for receiving input of a job execution request including the job program, service library-determining means for analyzing the job program obtained by the job execution request-obtaining means, determining the link libraries to be called by the job program, and registering associations between identification information for identifying the job program and identification information for identifying the link libraries in the service library management database, job submission means for determining submission destination nodes which are to be caused to execute the job program obtained by the job execution request-obtaining means, registering identification information for identifying the submission destination nodes and the identification information for identifying the job program in association with each other in the job submission destination management database, and transmitting the job program to the submission destination nodes for causing the submission destination nodes to execute the job program, submission destination-determining means operable when identification information for identifying a vulnerable library having a security defect is input, to refer to the service library management database to thereby obtain the identification information for identifying the job program corresponding to the identification information for identifying the vulnerable library, and refer to the job submission destination management database to thereby obtain the identification information for identifying the submission destination nodes corresponding to the obtained identification information for identifying the job program, and forcible job stop means for instructing the submission destination nodes to stop processes for executing the job program, based on the identification information for identifying the job program and the identification information for identifying the submission destination nodes, which are obtained by the submission destination-determining means.

Further, to attain the above object, in a third aspect of the present invention, there is provided a method of security management, for carrying out security management of a job submitted via a network by a computer. The method of security management is characterized by comprising a job execution request-obtaining step of receiving input of a job execution request including a job program, a service library-determining step of analyzing the job program obtained in the job execution request-obtaining step, determining the link libraries to be called by the job program, and registering associations between identification information for identifying the job program and identification information for identifying the link libraries in a service library management database, a job submission step of determining submission destination nodes which are to be caused to execute the job program obtained in the job execution request-obtaining step, registering identification information for identifying the submission destination nodes and the identification information for identifying the job program in association with each other in a job submission destination management database, and transmitting the job program to the submission destination nodes for causing the submission destination nodes to execute the job program, a submission destination-determining step of referring, when identification information for identifying a vulnerable library having a security defect is input, to the service library management database to thereby obtain the identification information for identifying the job program corresponding to the identification information for identifying the vulnerable library, and referring to the job submission destination management database to thereby obtain the identification information for identifying the submission destination nodes corresponding to the obtained identification information for identifying the job program, and a forcible job stop step of instructing the submission destination nodes to stop processes for executing the job program, based on the identification information for identifying the job program and the identification information for identifying the submission destination nodes, which are obtained in the submission destination-determining step.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 5 is a diagram showing an example of a data structure of a security database.

FIG. 6 is a diagram showing an example of a data structure of a service library management database.

FIG. 7 is a diagram showing an example of a data structure of a job submission destination management database.

DESCRIPTION OF THE PREFERRED EMBODIMENTS

The invention will now be described in detail with reference to drawings showing preferred embodiments thereof.

Figure 1:
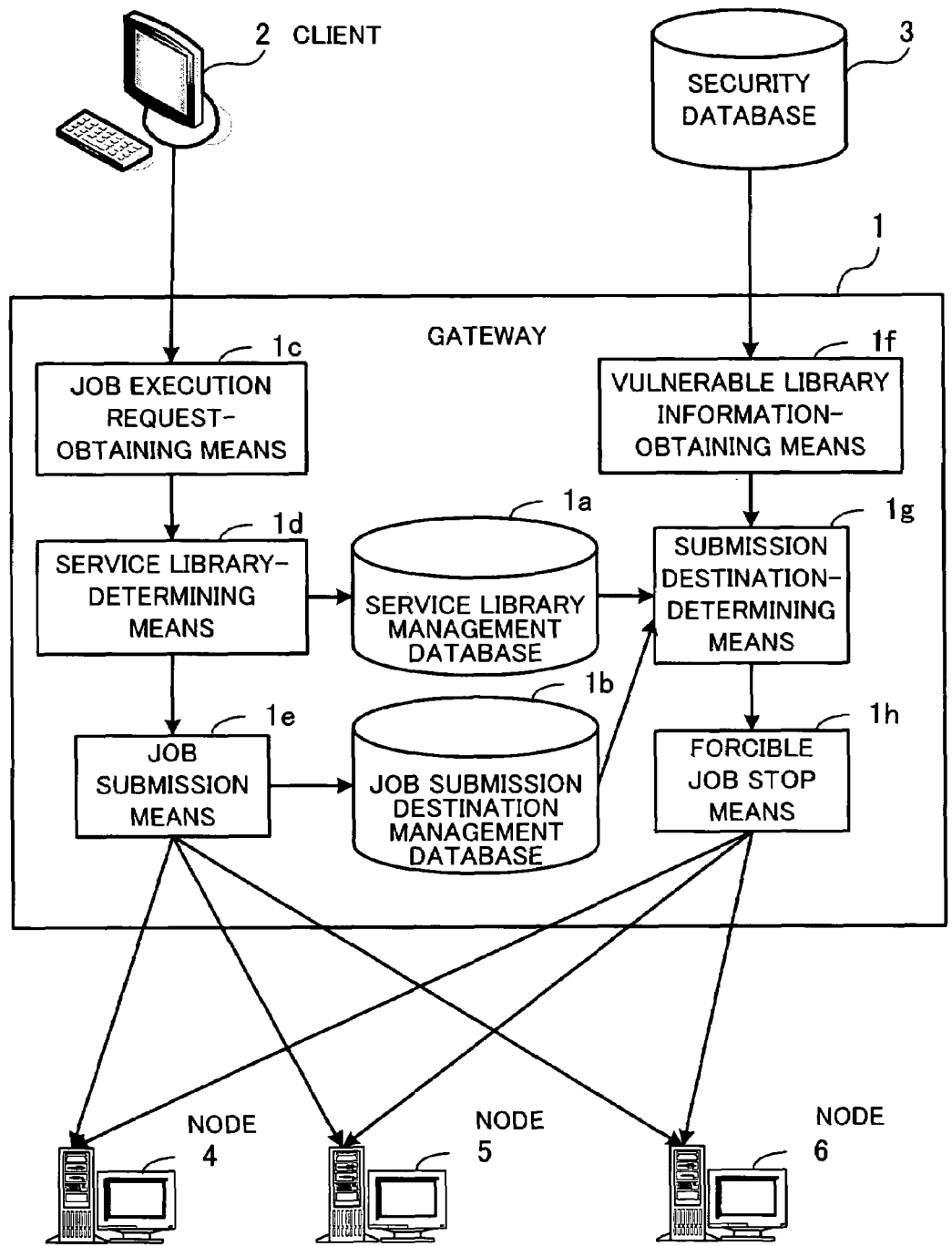
FIG. 1 is a schematic diagram showing the concept of embodiments of the invention.

FIG. 1 is a schematic diagram showing the concept of embodiments of the invention. As shown in the figure, a gateway 1 is connected to a client 2, a security database 3, and a plurality of nodes 4 to 6. Whenever a security defect is found in a library, identification information for identifying the vulnerable library is registered in the security database 3. The gateway 1 submits a job to the nodes 4 to 6 according to a job execution request received from the client 2. Further, based on the information on the hazardous library (vulnerable library) registered in the security database 3, the gateway 1 forcibly stops the job(s) using the library.

To implement the above-described processing, the gateway 1 is comprised of a service library management database 1a, a job submission destination management database 1b, a job execution request-obtaining means 1c, a service library-determining means 1d, a job submission means 1e, a vulnerable library information-obtaining means 1f, a submission destination-determining means 1g, and a forcible job stop means 1h.

The service library management database 1a stores associations between identification information for identifying job programs each describing processes of a job, and identification information for identifying link libraries called by the job programs. The job submission destination management database 1b stores associations between the identification information for identifying the job programs and identification information for identifying nodes to which jobs are submitted.

The job execution request-obtaining means 1c receives an input of a job execution request sent from the client 2. The job execution request includes a job program.

The service library-determining means 1d analyzes the job program obtained by the job execution request-obtaining means 1c, and determines link libraries which are to be called by the job program. Then, the service library-determining means 1d registers associations between identification information for identifying the job program and identification information for identifying the link libraries in the service library management database 1a.

The job submission means 1e determines submission destination nodes (the nodes 4 to 6 in the example illustrated in FIG. 1) which are to be caused to execute the job program obtained by the job execution request-obtaining means 1c, and then registers identification information for identifying the submission destination nodes and the identification information for identifying the job program in association with each other in the job submission destination management database 1b. Further, the job submission means 1e transmits the job program to the submission destination nodes to cause the nodes to execute the job program.

The vulnerable library information-obtaining means 1f periodically searches the security database 3 to thereby obtain identification information for identifying a vulnerable library. Then, the vulnerable library information-obtaining means 1f outputs the obtained information to the submission destination-determining means 1g.

When the identification information for identifying the vulnerable library having a security defect is input, the submission destination-determining means 1g refers to the service library management database 1a to obtain identification information for identifying a job program, which corresponds to the identification information for identifying the vulnerable library. Then, the submission destination-determining means 1g refers to the job submission management database 1b to obtain identification information for identifying submission destination nodes (the nodes 4 to 6 in the example illustrated in FIG. 1) which corresponds to the obtained identification information for identifying the job program.

The forcible job stop means 1h instructs the submission destination nodes to stop processes for executing the job program based on the identification information for identifying the job program and the identification information for identifying the submission destination nodes, obtained by the submission destination-determining means 1g.

When a job execution request is issued from the client 2 to the gateway 1, the job execution request is received by the job execution request-obtaining means 1c. Then, the service library-determining means 1d analyzes a job program contained in the job execution request obtained by the job execution request-obtaining means 1c, and determines link libraries which are to be called by the job program. Thereafter, the service library-determining means 1d registers associations between identification information for identifying the job program and identification information for identifying the link libraries in the service library management database 1a. Subsequently, the job submission means 1e determines submission destination nodes which are to be caused to execute the job program obtained by the job execution request-obtaining means 1c, and then registers identification information for identifying the submission destination nodes and the identification information for identifying the job program in association with each other in the job submission destination management database 1b. Further, the job submission means 1e transmits the job program to the submission destination nodes 4 to 6 to instruct the nodes to execute the job program.

The submission destination nodes 4 to 6 generate processes for executing jobs, and the job program is executed by the processes. Through execution of the job program by the nodes 4 to 6, the jobs (processing functions according to the job program) are executed.

When identification information for identifying a vulnerable library having a security defect is registered in the security database 3 thereafter, the vulnerable library information-obtaining means 1f obtains the identification information for identifying the vulnerable library. The obtained identification information for identifying the vulnerable library is input to the submission destination-determining means 1g. The submission destination-determining means 1g refers to the service library management database 1a to obtain identification information for identifying a job program, which corresponds to the identification information for identifying the vulnerable library. Further, the submission destination-determining means 1g refers to the job submission destination management database 1b to obtain identification information for identifying the submission destination nodes associated with the obtained identification information for identifying the job program. Then, the forcible job stop means 1h instructs the submission destination nodes 4 to 6 to stop the processes for executing the job program based on the identification information for identifying the job program and the identification information for identifying the submission destination nodes 4 to 6, obtained by the submission destination-determining means 1g.

The nodes 4 to 6 stop the processes executing the job program in response to the instruction for stopping the processes, issued from the gateway 1. As a result, the jobs being executed by respective nodes 4 to 6 are forcibly stopped.

This makes it possible to make an emergency stop of execution of the job program instantly even if a job program using the library is being executed by a large number of nodes, when a hazardous library is found out. As a result it is possible to minimize a time period over which the nodes 4 to 6 are left unattended in a hazardous state. Moreover, it is possible to inhibit oversight of a job program executing a hazardous library to thereby positively stop a hazardous job.

It should be noted that an administrator can input identification information for identifying a vulnerable library to the submission destination-determining means 1g by operating an input device, such as a keyboard. For example, there is a case where the administrator determines whether or not he/she should stop a job instantly, based on information on a vulnerable library registered in the security database 3. In such a case, the administrator refers to the security database 3 using the client 2, and when the administrator determines that the degree of emergency of the case is high, he/she uses the client 2 to input the identification information for identifying the vulnerable library to the submission destination-determining means 1g.

Now, embodiments of the present invention will be described in detail hereinafter.

First Embodiment

Figure 2:
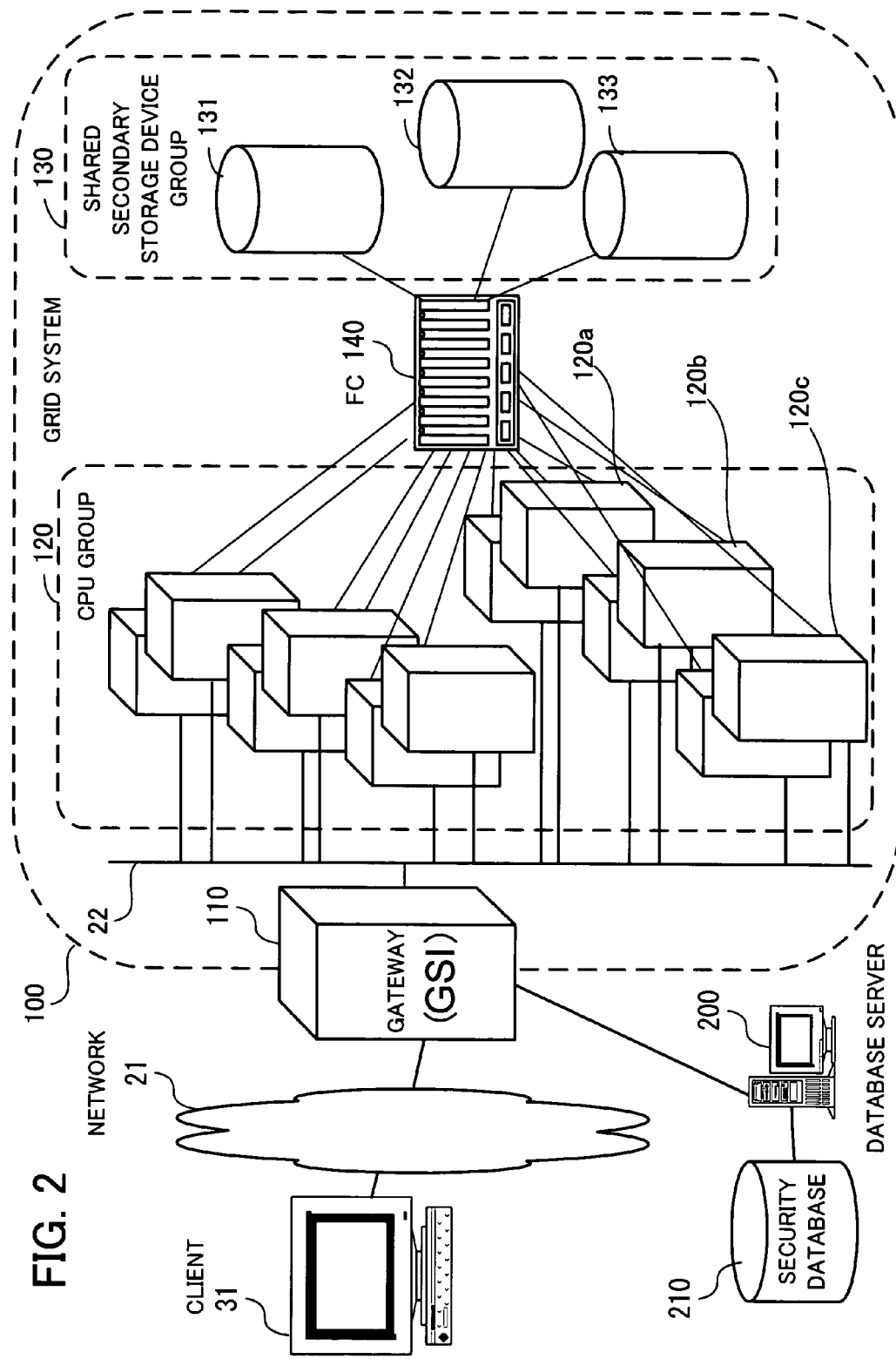
FIG. 2 is a diagram showing an example of a system configuration of a first embodiment of the invention.

FIG. 2 is a diagram showing an example of a system configuration of a first embodiment of the present invention. A client 31 is connected to a gateway 110 disposed in a grid system 100, via a network 21.

The grid system 100 is comprised of the gateway 110, a CPU group 120 formed by a plurality of nodes 120a, 120b, 120c, . . . , a fiber channel (FC) 140, and a shared secondary storage device group 130 formed by a plurality of shared secondary storage devices 131, 132, and 133.

The gateway 110 and the respective nodes 120a, 120b, 120c, . . . are connected via a network 22. Further, the nodes 120a, 120b, 120c, . . . , and the shared secondary storage devices 131, 132, and 133 are connected via the fiber channel 140.

The gateway 110 receives a request for submitting a job, from the client 31. In doing this, the gateway 110 performs processing for authenticating a certificate attached to the submitted job. The authentication of the certificate is performed e.g. using a GSI (Grid Security Infrastructure) function. When the certificate is properly authenticated, the gateway 110 divides the job, and submits the resulting divided jobs to the respective nodes of the CPU group 120.

The nodes 120a, 120b, 120c, . . . forming the CPU group 120 executes the jobs submitted from the gateway 110, respectively. In doing this, the nodes 120a, 120b, 120c, . . . store and read data in and from the shared secondary storage devices 131, 132, and 133, as required.

The gateway 110 is connected to a database server 200. The database server 200 includes a security database 210, and provides apparatuses, such as the gateway 110, with information in the security database 210. The security database 210 registers security information on libraries widely distributed.

Figure 3:
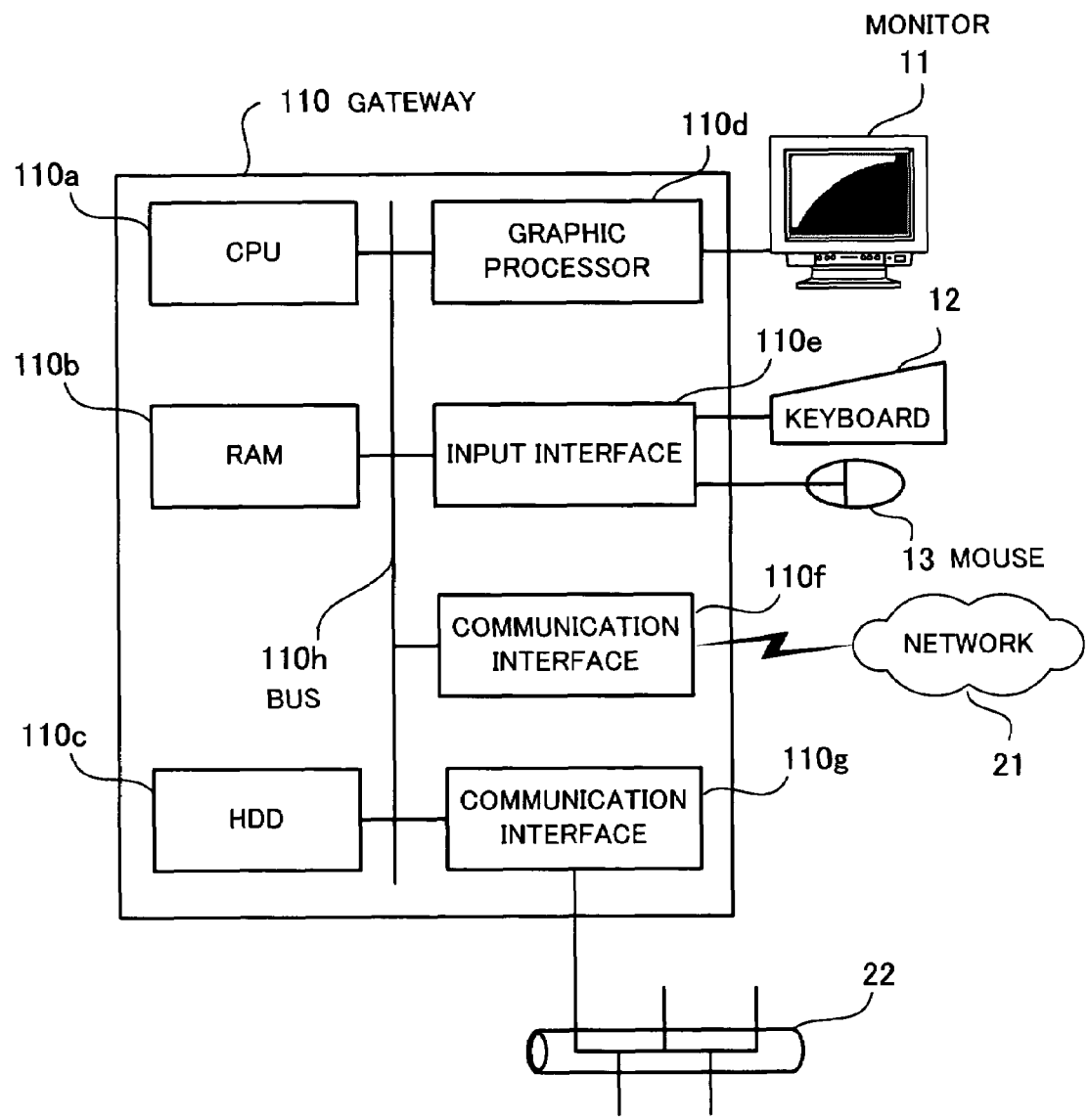
FIG. 3 is a diagram showing an example of a hardware configuration of a gateway used in the first embodiment.

FIG. 3 is a diagram showing an example of a hardware configuration of the gateway used in the first embodiment. The overall operation of the gateway 110 is controlled by a central processing unit (CPU) 110a. A random access memory (RAM) 110b, a hard disk drive (HDD) 110c, a graphic processor 110d, an input interface 110e, and communication interfaces 110f and 110g are connected to the CPU 110a via a bus 110h.

The RAM 110b temporarily stores at least part of the programs of an OS (Operating System) and application programs executed by the CPU 110a. Further, the RAM 110b stores various data required for processing by the CPU 110a. The HDD 110c stores the OS and the application programs.

The graphic processor 110d is connected to a monitor 11. The graphic processor 110d displays an image on the screen of the monitor 11 according to commands from the CPU 110a. A keyboard 12 and a mouse 13 are connected to the input interface 110e. The input interface 110e sends signals sent from the keyboard 12 and the mouse 13 to the CPU 110a via the bus 110h.

The communication interface 110f is connected to the network 21. The communication interface 110f performs transmission and reception of data to and from the client 31 over the network 21.

The communication interface 110g is connected to the network 22. The communication interface 110g performs transmission and reception of data to and from the nodes 120a, 120b, 120c, . . . over the network 22.

The hardware configuration described above can realize the processing functions of the present embodiment. It should be noted that although FIG. 3 shows the example of the hardware configuration of the gateway 110, it is also possible to realize each of the nodes 120a, 120b, 120c, . . . by the same hardware configuration.

Next, a description will be given of the functions of the gateway 110 and the nodes.

Figure 4:
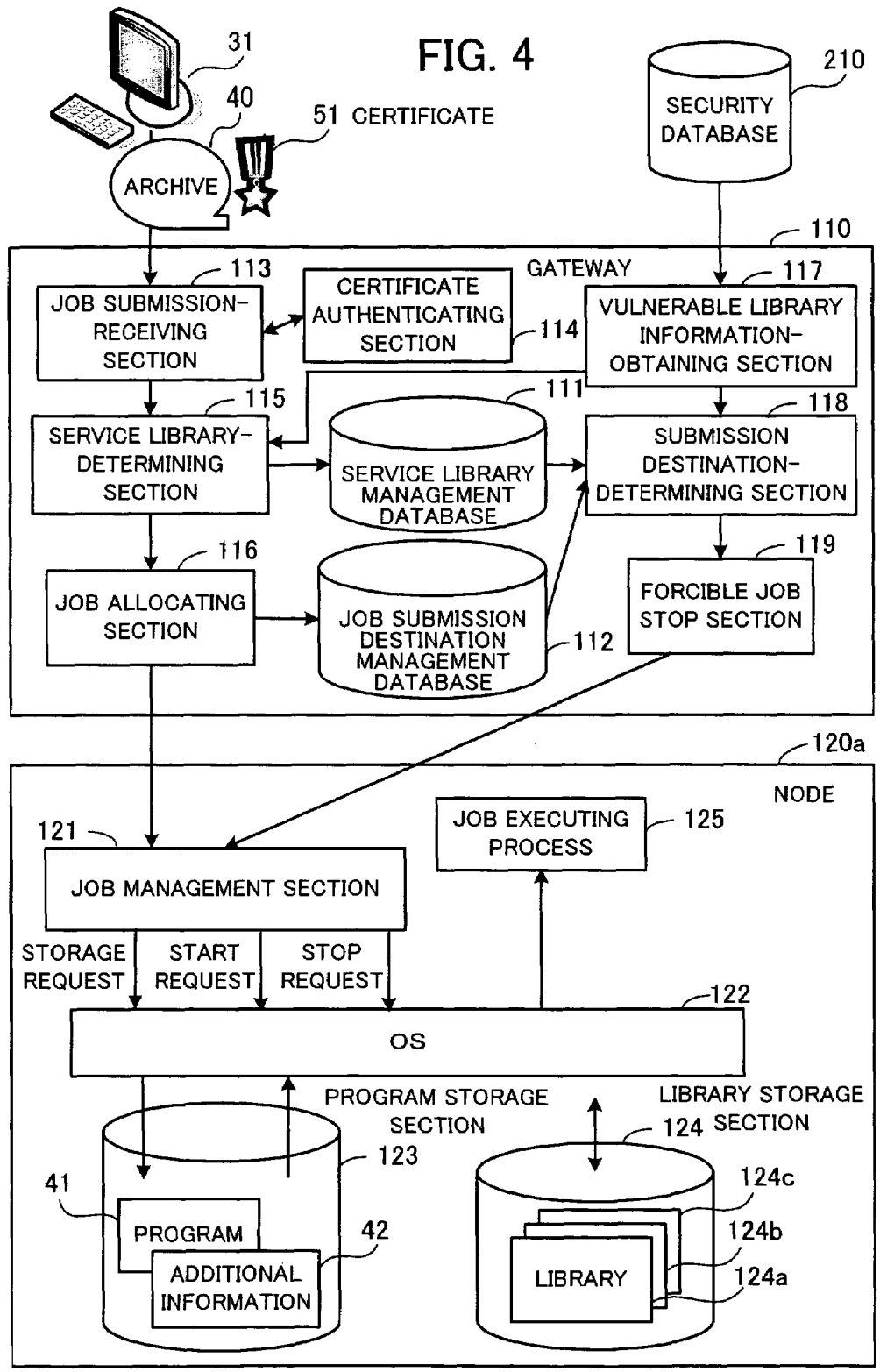
FIG. 4 is a block diagram showing the processing functions of the gateway and nodes according to the first embodiment.

FIG. 4 is a block diagram showing the processing functions of the gateway and the nodes according to the first embodiment. It should be noted that although FIG. 4 shows the functions of the node 120a as a representative, the other nodes have the same functions as those of the node 120a.

The gateway 110 is comprised of a service library management database 111, a job submission destination management database 112, a job submission-receiving section 113, a certificate authenticating section 114, a service library-determining section 115, a job allocating section 116, a vulnerable library information-obtaining section 117, a submission destination-determining section 118, and a forcible job stop section 119.

The service library management database 111 is a storage device that stores a list of libraries used in a program for executing submitted jobs. For example, part of a storage area of the HDD 110c is used as the service library management database 111.

The job submission destination management database 112 is a storage device that stores a list of nodes to which jobs are submitted. For example, part of a storage area of the HDD 110c is used as the job submission destination management database 112.

The job submission-receiving section 113 receives a request for executing a job, from the client 31. More specifically, the request for executing a job and an archive 40 with a certificate 51 are transmitted from the client 31. The archive 40 contains a program 41 (job program) describing the processes of a job, and additional information 42 in which is set information necessary for executing the program 41, such as information on settings of operating environments of the program 41.

As the archive 40, it is possible to use a ZAR (Zero Administration Archive), for example. The ZAR is an archive which enables execution of jobs only by information (programs and additional information) provided by the ZAR. More specifically, when the ZAR is executed, there is no need to incorporate functions e.g. of predetermined libraries in each of the nodes 120a, 120b, 120c, . . . in advance.

The certificate 51 is data for having a creator of the archive 40 authenticated by a certificate authority. This function is defined e.g. by an SSL (Secure Socket Layer).

When the job submission-receiving section 113 receives the archive 40 having the certificate 51 attached thereto from the client 31, the job submission-receiving section 113 passes the certificate 51 to the certificate authenticating section 114.

Then, upon reception of the result of authentication to the effect that the certificate is properly authenticated, from the certificate authenticating section 114, the job submission-receiving section 113 passes the archive 40 to the service library-determining section 115.

The certificate authenticating section 114 authenticates the identity of the creator of the archive 40 based on the received certificate 51. The authentication process is realized e.g. by asking the certificate authority, not shown, to authenticate the identity of the creator. The authentication of the certificate is carried out e.g. by a GSI function. When the certificate 51 is properly authenticated, the certificate authenticating section 114 outputs the result of the authentication process to the job submission-receiving section 113.

The service library-determining section 115 determines libraries that are used in a program. More specifically, the service library-determining section 115 analyzes a program in the archive 40 passed from the job submission-receiving section 113, and detects the titles (library names) of libraries used in the program.

Then, the service library-determining section 115 registers the program name of the analyzed program and the detected library names in association with each other in the service library management database 111. Subsequently, the service library-determining section 115 passes the archive 40 to the job allocating section 116.

The job allocating section 116 determines a plurality of nodes so as to cause the nodes to execute the submitted job. For example, the job allocating section 116 monitors loads on the nodes, and selectively causes nodes with smaller loads to execute the job. Upon determination of the nodes, the job allocating section 116 submits the job to the nodes which should be caused to execute the job. More specifically, the job allocating section 116 transmits the request for executing the job and the archive 40 to the nodes.

The vulnerable library information-obtaining section 117 periodically refers to the contents of the security database 210 to thereby obtain identification information for identifying a vulnerable library (library name and version). Then, the vulnerable library information-obtaining section 117 passes the obtained information to the submission destination-determining section 118.

Based on the identification information for identifying the vulnerable library, the submission destination-determining section 118 identifies nodes which are executing a program or programs using the vulnerable library. More specifically, the submission destination-determining section 118 refers to the service library management database 111 to extract the program name of any program using the vulnerable library indicated by the identification information for identifying the library obtained from the vulnerable library information-obtaining section 117. Then, the submission destination-determining section 118 refers to the job submission destination management database 112 to extract information (e.g. IP (Internet Protocol) addresses) for identifying job submission destination nodes to which the job including the program having the extracted program name is submitted. Further, the submission destination-determining section 118 passes a set of the extracted node identification information and the program name to the forcible job stop section 119.

The forcible job stop section 119 transmits a job stop request specifying the program name received from the section 118 to nodes corresponding to the node identification information received from the submission destination-determining section 118.

The node 120a is comprised of a job management section 121, an OS 122, a program storage section 123, and a library storage section 124.

The job management section 121 separates the program 41 and the additional information 42 from the archive 40 passed from the gateway 110, and issues a request for storing the program 41 and the additional information 42 to the file system of the OS 122. Then, to execute the job, the job management section 121 issues a request for starting the stored program 41 to the OS 122.

Further, upon reception of a program stop request transmitted from the gateway 110, the job management section 121 issues a request for stopping a process corresponding to a program name designated by the program stop request to the OS 122. More specifically, upon reception of the program stop request, the job management section 121 obtains a list (process list) of processes being currently executed via the OS 122. The process list shows process information including the process IDs of currently operating processes, and the program names of programs executed by the processes.

The job management section 121 extracts the process ID of the process executing the program having the program name designated by the program stop request, from the obtained process list. Then, the job management section 121 designates the extracted process ID to issue a request for stopping the processes to the OS 122.

The OS 122 controls the overall operation of the node 120a. The OS 122 includes the file system, and writes a file in an HDD according to a request from an application program, such as the job management section 121. Further, when receiving a start request designating the program 41, the OS 122 starts a job executing process 125 for executing the program 41, and causes the started job executing process 125 to perform processing described in the program 41.

Further, the OS 122 has the function of producing a process list, and produces a process list of currently operating processes when the OS 122 receives a request for producing the process list. Furthermore, the OS 122 has the function of forcibly stopping a desired process. More specifically, when receiving a stop request designating the process ID, the OS 122 forcibly stops the corresponding process.

The program storage section 123 is a storage device for storing the program 41 and the additional information 42 contained in the archive 40. For example, part of a storage area of the HDD is used as the program storage section 123.

The library storage section 124 is a storage device for storing the libraries 124a, 124b, and 124c. For example, part of the storage area of the HDD is used as the library storage section 124.

Next, a description will be given of an example of the data structure of each database shown in FIG. 4.

FIG. 5 is a diagram showing an example of the data structure of the security database. The security database 210 is provided with columns of "Library Name", "Version", and "Risk".

In the column of "Library Name" are set the titles (library names) of libraries each suffering a defect found in security. In the column of "Version" are set versions of the libraries each suffering a defect found in security. In the column of "Risk" are set levels of risks to be posed, when defects in security are left unattended. In the example illustrated in FIG. 5, when a defect poses a great risk, "Great" is set, when a defect poses a medium risk, "Medium" is set, and when a defect poses a small risk, "Small" is set.

When the risk of a library is "Great", it is necessary to immediately stop a program that is using the library. When the risk of a library is "Medium", it is necessary to remedy the defect of the library after completion of the process of a program that is using the library. When the risk of a library is "Small", it is desired to remedy the defect of the library though the remedy of the defect is not essential. It should be noted that when the risk of a library used by a job program describing the details of processing of a job to be submitted is "Great" or "Medium", the submission of the job is canceled.

FIG. 6 is a diagram showing an example of the data structure of the service library management database. The service library management database 111 has columns for "Program Name", "Service Library Name", and "Version".

The titles (program names) of programs that are included in the archive 40 are set in the column for "Program Name". The titles (library names) of libraries used during execution of each program are set in the column for "Service Library Name". The versions of libraries used during execution of the program are set in the column for "Version".

FIG. 7 is a diagram showing an example of the data structure of the job submission destination management database. The job submission destination management database 112 has columns for "Program Name", "Distribution Destination Node Name", and "IP Address".

The titles (program names) of programs for execution of jobs that have been submitted are set in the column for "Program Name". The respective names (node names) of distribution destination nodes to which the programs have been distributed in submitting the jobs are set in the column for "Distribution Destination Node Name". The IP addresses of the respective distribution destination nodes are set in the column for "IP Address".

With the configuration described above, the submission of jobs and the security management of libraries are carried out. Hereinafter, processing carried out by the present embodiment will be described by dividing the processing into a process carried out when a job is submitted, and a process carried out when a security defect is detected.

Figure 8:
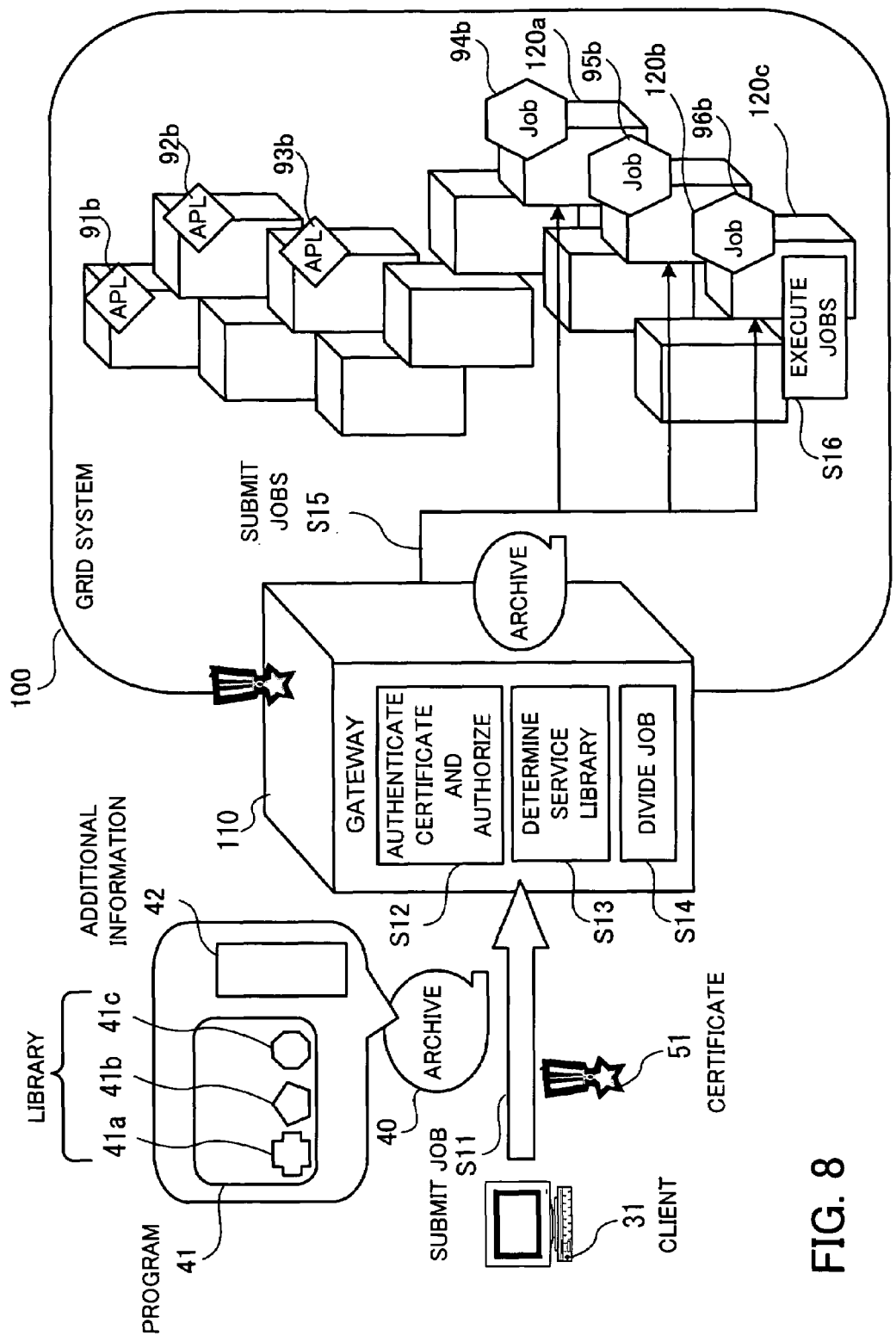
FIG. 8 is a conceptual diagram showing a process carried out when a job is input.

FIG. 8 is a conceptual diagram showing the process carried out when a job is submitted. FIG. 8 shows the gateway 110 and the nodes 120a, 120b, 120c, . . . in the grid system 100. Some of the nodes forming the grid system 100 are executing client applications 91b, 92b, and 93b. Now, let it be assumed that in the above state, the nodes (nodes 120a, 120b, and 120c in the example illustrated in FIG. 8) are caused to execute jobs 94b, 95b, and 96b.

First, a job is submitted from the client 31 (step S11). In submitting the job, a request for executing the job and the archive 40 with the certificate 51 are transmitted from the client 31 to the gateway 110. The archive 40 includes the program 41 and the additional information 42.

It should be noted that the program 41 uses libraries 41a, 41b, and 41c. More specifically, the description of processes in the program 41 contains descriptions (links) for calling the libraries 41a, 41b, and 41c. The libraries 41a, 41b, and 41c are embedded in the program 41, for example. Further, the program 41 sometimes contains only descriptions for calling the libraries 124a, 124b, and 124c which have been distributed to the respective nodes in advance.

Upon reception of the archive 40 with the certificate 51, the gateway 110 performs a process for authentication of the certificate 51 and authorization (step S12). When the certificate 51 is properly authenticated, the gateway 110 determines the libraries 41a, 41b, and 41c which are used in the program 41, and stores the result of the determination (step S13). Further, the gateway 110 divides the job (step S14).

Subsequently, the gateway 110 submits the divided jobs to the nodes 120a, 120b, and 120c (step S15). In doing this, the gateway 110 stores information on the submission destination nodes to which the respective jobs are submitted (distribution destination nodes to which the program is distributed).

In submitting the jobs to the nodes 120a, 120b, and 120c, the archive 40 is transmitted to the nodes 120a, 120b, and 120c together with a request for processing the jobs. The nodes 120a, 120b, and 120c to which the jobs have been submitted take out the program 41 and the additional information 42 from the archive 40, and carry out the jobs 94b, 95b, and 96b, respectively (step S16). It should be noted that the nodes 120a, 120b, and 120c carry out data processing according to the details of descriptions in the program 41 to thereby perform the jobs 94b, 95b, and 96b.

Next, the process carried out when a job is submitted will be described in more detail.

Figure 9:
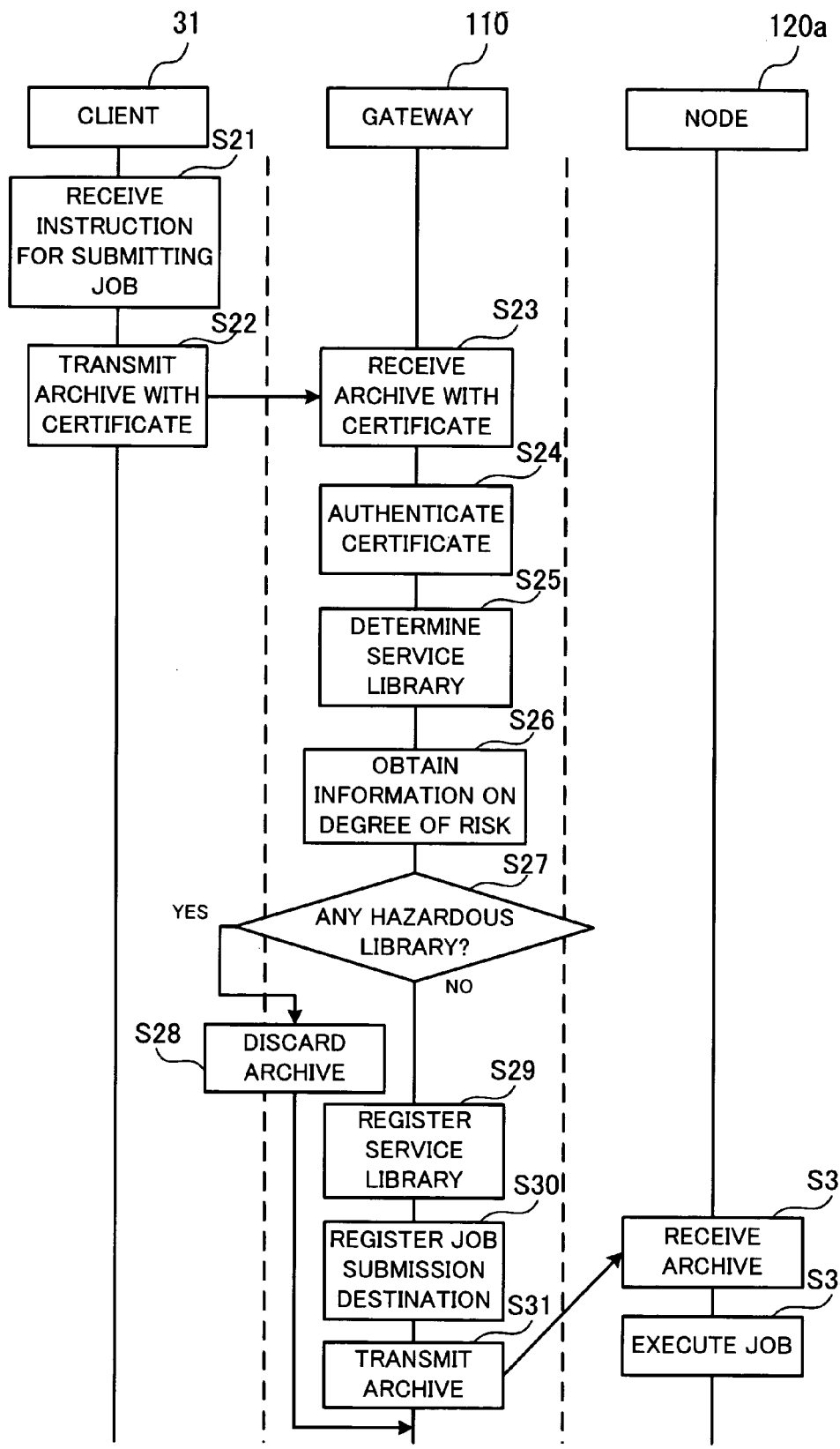
FIG. 9 is a sequence diagram showing a job executing process for executing the job.

FIG. 9 is a sequence diagram showing the process for executing the job. Hereinafter, a description will be given of the process shown in FIG. 9, following the order of step numbers.

[Step S21] The client 31 receives an instruction for submitting the job, from the user.

[Step S22] The client 31 transmits the archive 40 with the certificate 51 to the gateway 110.

[Step S23] The job submission-receiving section 113 of the gateway 110 receives the archive 40 with the certificate 51. Then, the job submission-receiving section 113 passes the certificate 51 to the certificate authenticating section 114.

[Step S24] The certificate authenticating section 114 of the gateway 110 performs an authentication process on the certificate 51, and passes the result of the authentication to the job submission-receiving section 113.

[Step S25] When the certificate 51 is properly authenticated, the job submission-receiving section 113 passes the archive 40 to the service library-determining section 115. The service library-determining section 115 analyzes the program 41 contained in the archive 40, and determines the libraries 41a, 41b, and 41c which are used in the program 41. More specifically, the service library-determining section 115 extracts descriptions for calling the libraries from the program 41, and determines library names and versions which are to be called.

[Step S26] The service library-determining section 115 obtains information on the degrees of risks of the libraries (the library names and versions of libraries whose risks are "Great" or "Medium"). More specifically, the service library-determining section 115 requests the vulnerable library information-obtaining section 117 to obtain information registered in the security database 210. In response to the request from the service library-determining section 115, the vulnerable library information-obtaining section 117 refers to the security database 210 and obtains the library names and versions of libraries whose risks are "Great" or "Medium". Then, the vulnerable library information-obtaining section 117 passes a list of the obtained library names and versions to the service library-determining section 115.

[Step S27] The service library-determining section 115 determines whether or not there is a hazardous library out of the libraries 41a, 41b, and 41c which are used in the program 41. More specifically, the service library-determining section 115 determines whether or not any of the sets of the library names and the versions determined in the step S25 are included in the list of the library names and versions received from the vulnerable library information-obtaining section 117. If at least one of the sets is included in the list, the service library-determining section 115 determines that a hazardous library is included in the libraries 41a, 41b, and 41c, and causes the present process to proceed to a step S28. If no hazardous library is found, the present process proceeds to a step S29.

[Step S28] The service library-determining section 115 stops the submission of the job, and discards the archive 40, followed by terminating the process.

[Step S29] When the security of all the libraries is confirmed, the service library-determining section 115 registers the program name of the program 41, and the library names and versions of the libraries 41a, 41b, and 41c that are used in the program 41, in association with each other in the service library management database 111.

[Step S30] The service library-determining section 115 passes the archive 40 to the job allocating section 116. The job allocating section 116 determines one or more nodes for executing the job. Further, the job allocating section 116 registers the program name of the program 41 included in the archive 40, the node names of nodes to which the archive 40 are to be transmitted, and the IP addresses of the nodes, in association with each other in the job submission destination management database 112.

[Step S31] The job allocating section 116 transmits the archive 40 to the submission destination nodes including the node 120a.

[Step S32] The job management section 121 of the node 120a receives the archive 40. The job management section 121 takes out the program 41 and the additional information 42 from the received archive 40, and issues a request for storing them to the OS 122. Then, the OS 122 stores the program 41 and the additional information 42 in the program storage section 123.

[Step S33] The node 120a starts a job executing process 125, and executes the program 41 included in the received archive 40. More specifically, the job management section 121 of the node 120a issues a request for starting the program 41 to the OS 122. The OS 122 generates the job executing process 125 for executing the program 41. The OS 122 reads out the program 41, and causes the job executing process 125 to execute the program 41.

Next, a description will be given of the process carried out when a security defect is detected in a library.

Figure 10:
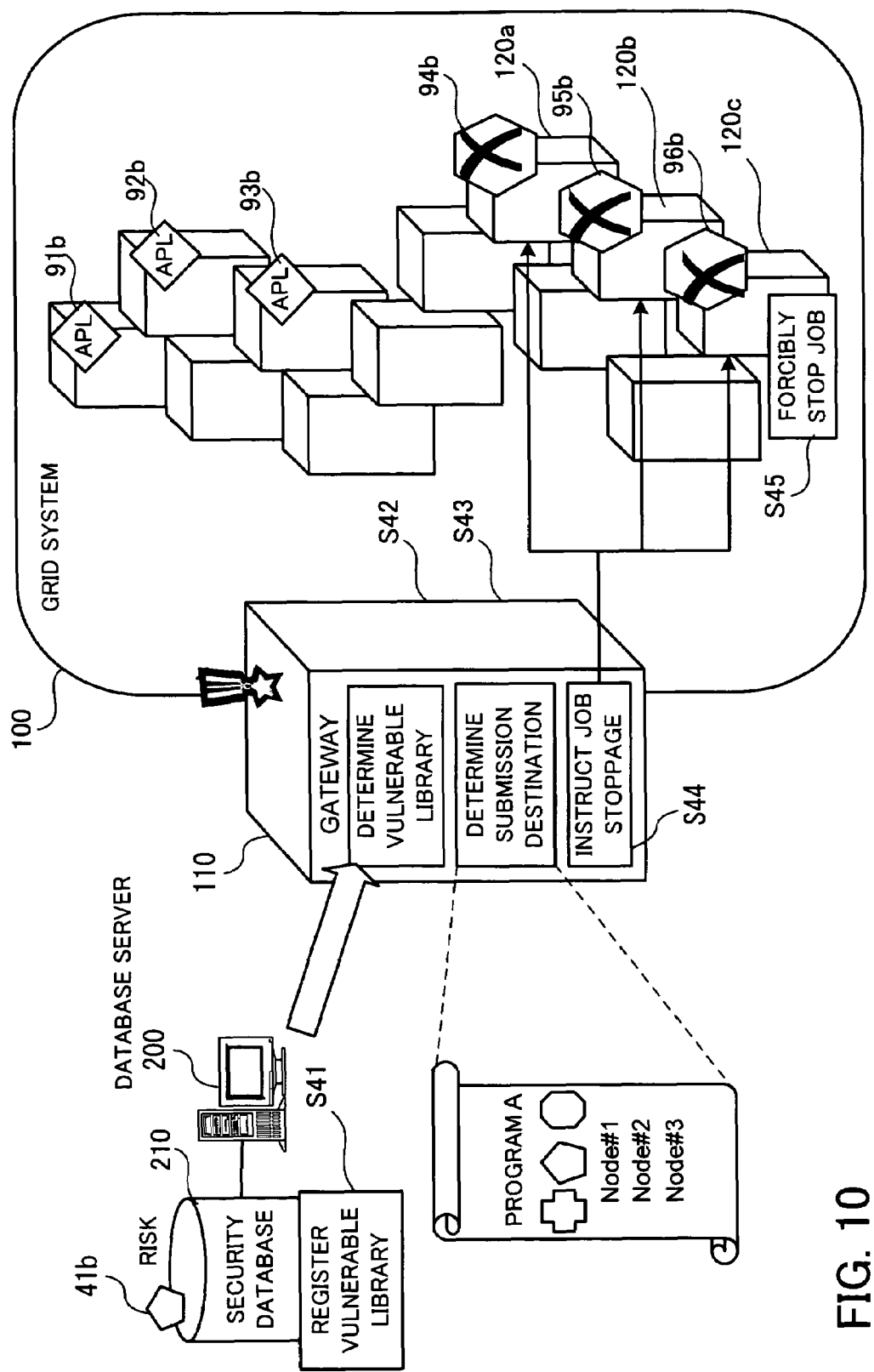
FIG. 10 is a conceptual diagram showing a process carried out when a security defect is detected in a library.

FIG. 10 is a conceptual diagram showing the process carried out when a security defect is detected in a library. First, in the database server 200, information on a library (vulnerable library) having a security defect is registered in the security database 210 through an input operating by the administrator (step S41). Let it be assumed that in the illustrated example, the library 41b is registered to be of "Great" in the degree of risk.

The gateway 110 periodically accesses the database server 200 to obtain updated information in the security database 210, and determines whether or not a new vulnerable library is registered (step S42).

When detecting that the library 41b is registered as a library of "Great" risk, the gateway 110 determines destination nodes to which the library 41b has been submitted (step S43). For example, let it be assumed that "Program A" uses the libraries 41a, 41b, and 41c, and jobs executed by the "Program A" have been submitted to respective nodes having the respective node names of "Node#1", "Node#2", and "Node#3".

In this case, the gateway 110 instructs the nodes 120a, 120b, and 120c to which has been submitted the program 41 using the library 41b, to stop the corresponding jobs (step S44). The jobs 94b, 95b, and 96b are forcibly stopped in the nodes 120a, 120b, and 120c instructed to stop the jobs (step S45).

Next, a more detailed description will be given of the monitoring of the security database 210 by the gateway 110, and the job stop process executed by the same when a security defect.

Figure 11:
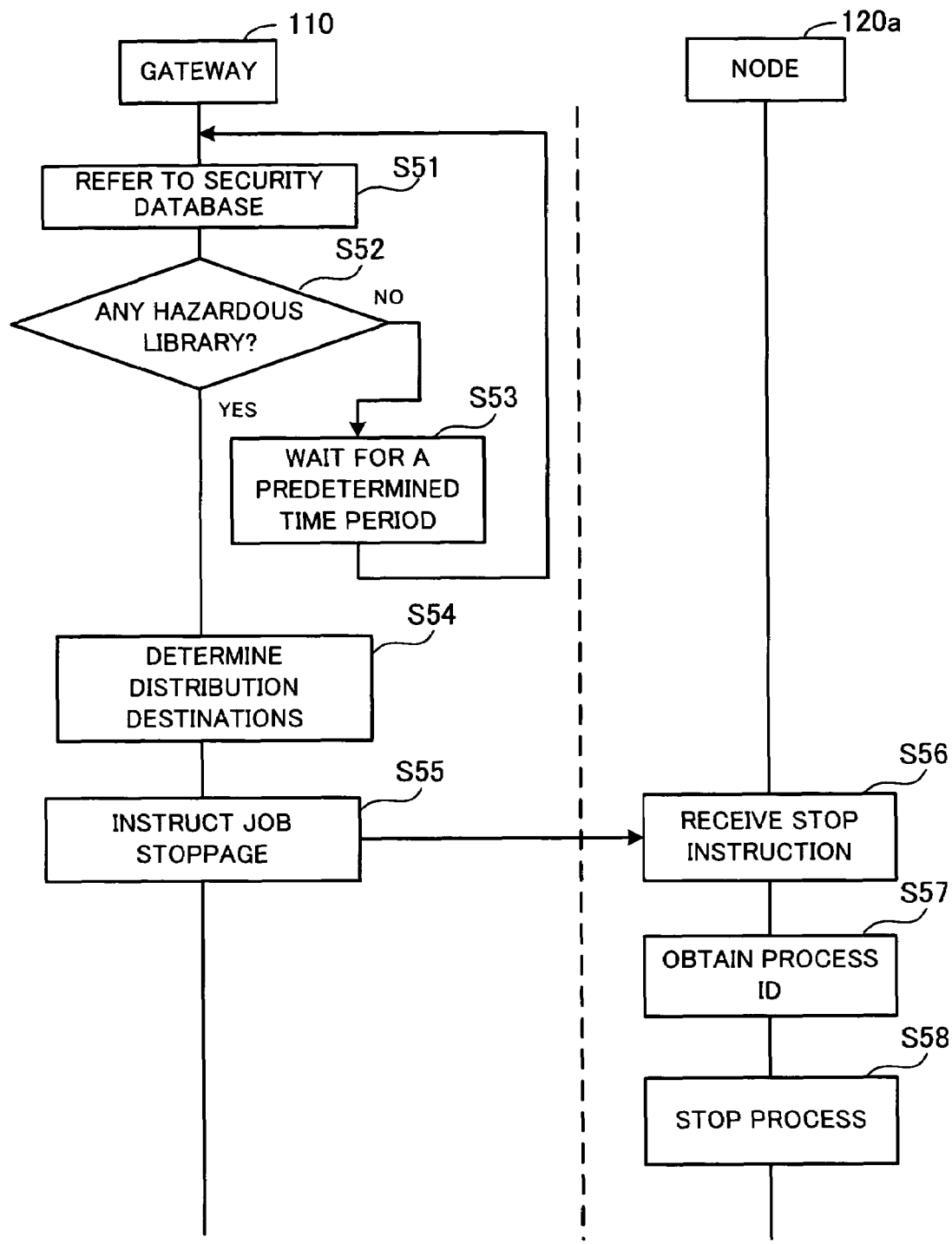
FIG. 11 is a sequence diagram showing the process carried out when a security defect is detected.

FIG. 11 is a sequence diagram showing the process carried out when a security defect is detected. Hereinafter, a description will be given of the process shown in FIG. 11, following the order of step numbers.

[Step S51] The vulnerable library information-obtaining section 117 of the gateway 110 refers to the security database 210 to obtain the library names and the versions of libraries whose risks are registered to be "Great". Then, the vulnerable library information-obtaining section 117 passes a list of the obtained library names and versions to the submission destination-determining section 118.

[Step S52] The submission destination-determining section 118 determines whether or not there is a hazardous library. More specifically, the submission destination-determining section 118 determines whether or not any of the sets of the library names and the versions included in the list of the library names and versions obtained in the step S51 are registered in the service library management database 111. If at least one of the sets is registered, it is determined that there is a hazardous library. If there is a hazardous library, the present process proceeds to a step S54, whereas if there is no hazardous library, the present process proceeds to a step S53.

[Step S53] The vulnerable library information-obtaining section 117 waits for a predetermined time period, and then, the present process proceeds to the step S51.

[Step S54] The submission destination-determining section 118 determines submission destination nodes to which has been submitted a program which executes the hazardous library. More specifically, the submission destination-determining section 118 obtains program names associated with the library names and versions obtained in the step S51, from the service library management database 111. Then, the submission destination-determining section 118 refers to the job submission destination management database 112 to detect any entry of the obtained program names.

Subsequently, the submission destination-determining section 118 extracts an IP address of each of any detected entry of the program names, from data stored in the job submission destination management database 112. Further, the submission destination-determining section 118 passes a set of the extracted program name and IP address to the forcible job stop section 119.

[Step S55] The forcible job stop section 119 instructs the node executing the program using the hazardous library to stop the job performed based on the program. When there are plurality of concerned nodes, the forcible job stop section 119 instructs the nodes to stop their jobs.

More specifically, when the forcible job stop section 119 receives a set of the program name and the IP address from the submission destination-determining section 118, the forcible job stop section 119 transmits a job stop instruction designating the program name to the IP address over the network. Since the IP address passed from the submission destination-determining section 118 is an IP address of the node to which has been submitted a job using the corresponding program, the job stop instruction is transmitted to the node to which has been submitted the job.

[Step S56] In the node 120a, the job management section 121 receives the job stop instruction.

[Step S57] The job management section 121 obtains the process ID of a process corresponding to the program name designated by the job stop instruction. More specifically, when receiving the job stop instruction, the job management section 121 demand the OS 122 of a list of processes in operation. The OS 122 passes the list of processes to the job management section 121. On the list of processes are described the process IDs of currently operating processes and the program names of programs executed by the processes.

The job management section 121 extracts a process executing the program corresponding to the program name designated by the job stop instruction, and obtains the process ID of the extract processes from the list of processes. For example, when the library 41b used by the program 41 is hazardous, the process ID of the job executing process 125 for executing the program 41 is obtained.

[Step S58] The job management section 121 designates the process ID obtained in the step S57 to issue a process-stopping request to the OS 122. The OS 122 forcibly stops a process corresponding to the designated process ID according to the stopping request.

As described hereinabove, it is possible to prevent programs using a library having a security problem from being distributed to nodes and executed. Moreover, when a risk of a library is found by the administrator, it is possible to positively stop programs using the hazardous library in all the nodes executing the programs. This makes it possible to prevent a large number of computation nodes from being attacked from outside.

Second Embodiment

Next, a second embodiment will be described. The second embodiment is provided for automatically remedying a defect of a library after stoppage of a job, and resuming the job.

Figure 12:
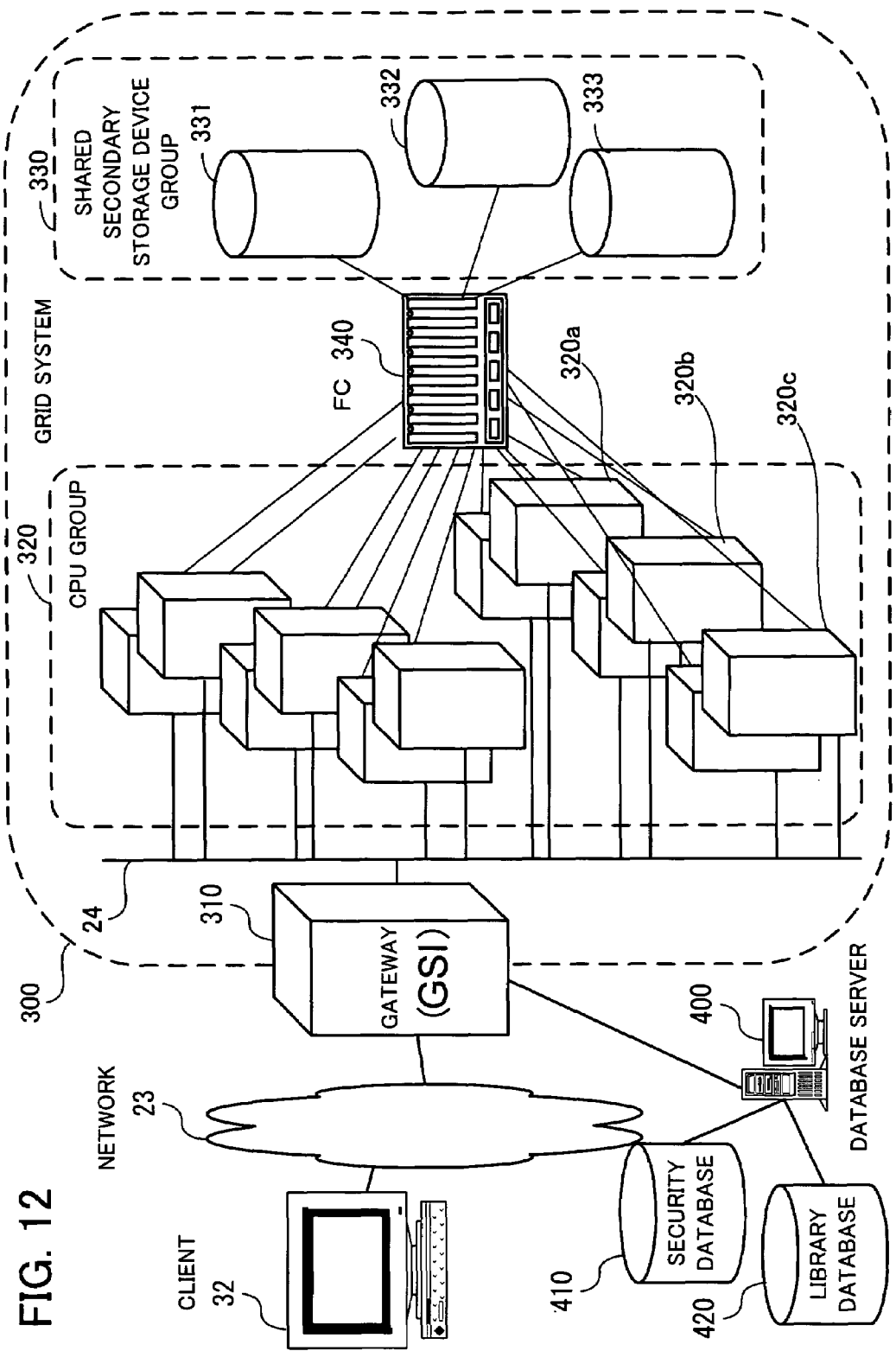
FIG. 12 is a diagram showing an example of a system configuration of a second embodiment of the invention.

FIG. 12 is a diagram showing an example of a system configuration of the second embodiment. A client 32 is connected to a gateway 310 disposed in a grid system 300 via a network 23.

The grid system 300 is comprised of the gateway 310, a CPU group 320 formed by a plurality of nodes 320a, 320b, 320c, . . . , a fiber channel (FC) 340, and a shared secondary storage device group 330 formed by a plurality of shared secondary storage devices 331, 332, and 333.

The gateway 310 and the nodes 320a, 320b, 320c, . . . are connected via a network 24. Further, the nodes 320a, 320b, 320c, . . . , and the shared secondary storage devices 331, 332, and 333 are connected via the fiber channel 340.

The gateway 310 receives a request for submitting a job from the client 32. In doing this, the gateway 310 performs processing for authenticating a certificate attached to the submitted job. When the certificate is properly authenticated, the gateway 310 divides the job, and inputs the divided jobs to selected ones of the nodes of the CPU group 320.

The nodes 320a, 320b, 320c, . . . forming the CPU group 320 executes the jobs submitted from the gateway 310, respectively. In doing this, the nodes 320a, 320b, 320c, . . . store and read out data in and from the shared secondary storage devices 331, 332, and 333, as required.

The gateway 310 is connected to a database server 400. The database server 400 includes a security database 410 and a library database 420, and provides the gateway 310 and the nodes 320a, 320b, 320c, . . . with information in these databases. Security information on libraries widely distributed is registered in the security database 410. Libraries of latest versions (libraries in which no defects in security has been found) are registered in the library database 420.

Figure 13:
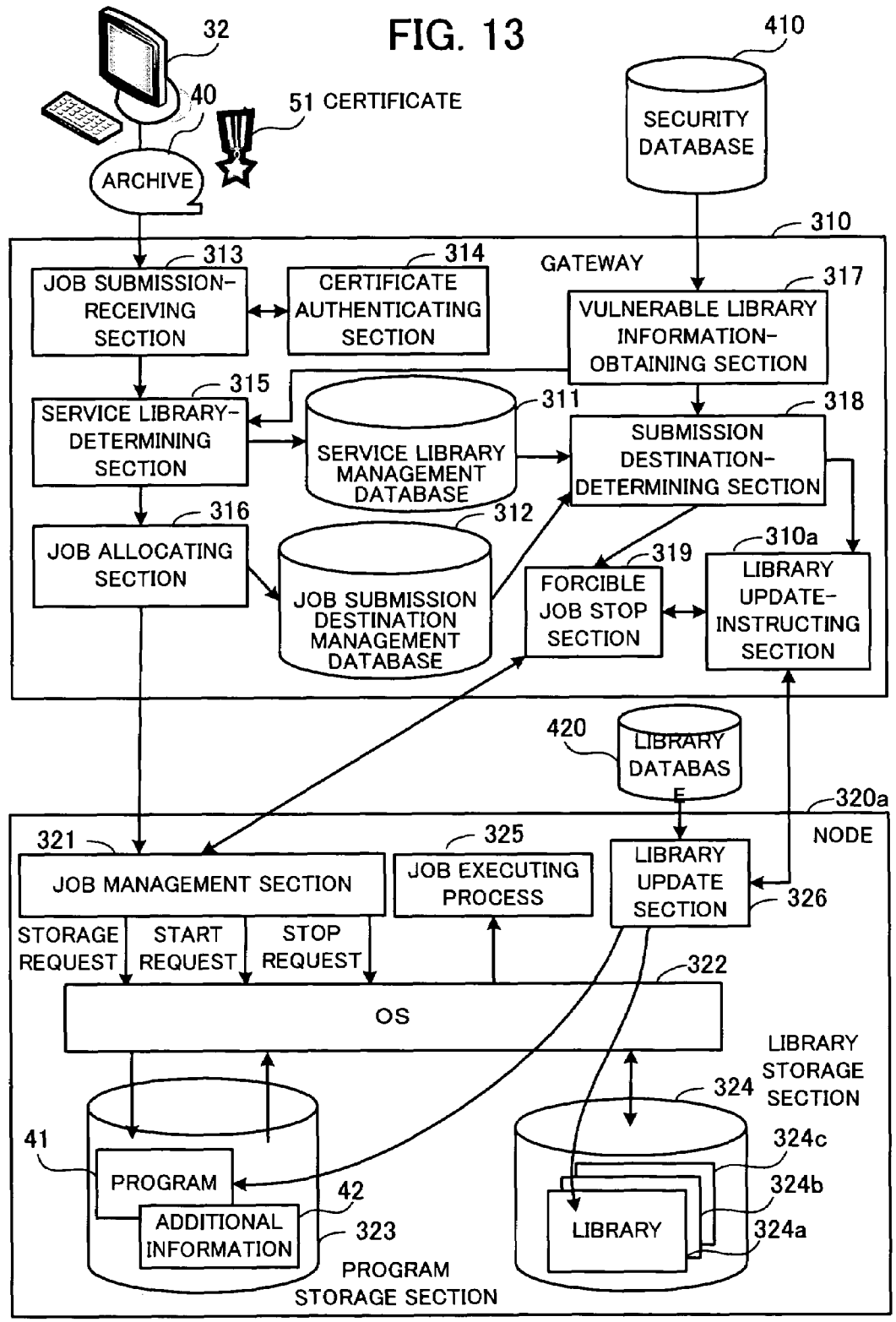
FIG. 13 is a block diagram showing the processing functions of a gateway and nodes according to the second embodiment.

FIG. 13 is a block diagram showing the processing functions of the gateway and the nodes according to the second embodiment. The gateway 310 is comprised of a service library management database 311, a job submission destination management database 312, a job submission-receiving section 313, a certificate authenticating section 314, a service library-determining section 315, a job allocating section 316, a vulnerable library information-obtaining section 317, a submission destination-determining section 318, a forcible job stop section 319, and a library update-instructing section 310a.

Out of the component elements of the gateway 310, the service library management database 311, the job submission destination management database 312, the job submission-receiving section 313, the certificate authenticating section 314, the service library-determining section 315, the job allocating section 316, and the vulnerable library information-obtaining section 317 have the same functions as those of the identically named component elements of the FIG. 4 gateway 110 according to the first embodiment. The submission destination-determining section 318, and the forcible job stop section 319 have not only the same functions as those of the identically named component elements of the FIG. 4 gateway 110 according to the first embodiment but also the following functions:

After determining nodes to which the job using the vulnerable library has been submitted, the submission destination-determining section 318 passes a set of extracted information (IP addresses) for identifying the nodes, and identification information for identifying the vulnerable library to the library update-instructing section 310a.

When the forcible job stop section 319 receives a response of completion of stoppage of a job from a node 320a to which has been transmitted a request for stopping the job, the forcible job stop section 319 delivers a notification that preparation for updating the library has been completed, to the library update-instructing section 310a. Further, upon reception of a notification that elimination of the risk of the library has been completed, from the library update-instructing section 310a, the forcible job stop section 319 transmits a request for restarting the job, to the node 320a.

When the library update-instructing section 310a receives the notification of completion of the preparation for updating the library from the forcible job stop section 319, the library update-instructing section 310a instructs updating the vulnerable library to a latest version thereof. More specifically, the library update-instructing section 310a determines a library to be updated, based on the library identification information received from the submission destination-determining section 318. Then, the library update-instructing section 310a instructs the node 320a to update the library based on the node-identifying information received from the submission destination-determining section 318. At this time, the library update-instructing section 310a designates identification information for identifying the library to be updated. When receiving a response of completion of updating the library form the node 320a, the library update-instructing section 310a delivers a notification that elimination of the risk of the library has been completed, to the forcible job stop section 319.

The node 320a is comprised of a job management section 321, an OS 322, a program storage section 323, a library storage section 324, and a library update section 326. The OS 322, the program storage section 323, and the library storage section 324 have the same functions as those of the identically named component elements of the FIG. 4 node 120a according to the first embodiment. Further, the job management section 321 has not only the same functions as those of the identically named component element of the FIG. 4 node 120a according to the first embodiment but also the following functions:

The job management section 321 issues a request for stopping a process to the OS 322, and confirms if the process is stopped. For example, the job management section 321 issues a request for obtaining a process list to the OS 322, and confirms if a process to be forcibly stopped is not included in the process list returned from the OS 322. After confirming that the process to be forcibly stopped has been stopped, the job management section 321 transmits a response of completion of the stoppage to the gateway 310.

Further, upon reception of a job restart request from the gateway 310, the job management section 321 restarts a job that has been stopped by the forcible stoppage of the process. More specifically, the job management section 321 issues a request for restarting the program 41 that has been executed by a job executing process 325 having been stopped forcibly. Thus, the job executing process 325 is generated again by the OS 322, and the program 41 is executed by the job executing process 325.

Upon reception of a library update instruction from the gateway 310, the library update section 326 obtains a library of the latest version, having the same library name, from the library database 420 based on identification information for identifying the library designated by the library update instruction. Then, the library update section 326 updates the library to be updated to the latest version by the obtained library.

If the library to be updated is one of libraries 324a, 324b, and 324c stored in the library storage section 324, the library update section 326 replaces the concerned library by a library obtained from the library database 420. Further, if the library to be updated is incorporated in the program 41, the library update section 326 replaces a portion of the program 41, corresponding to the concerned library, by the library obtained from the library database 420. After completion of the updating of the library, the library update section 326 transmits a response of completion of the updating to the gateway 310.

The configuration described above makes it possible to automatically update a hazardous library to a safe latest version. Hereinafter, a description will be given of the procedure of a process for automatically updating a hazardous library.

Figure 14:
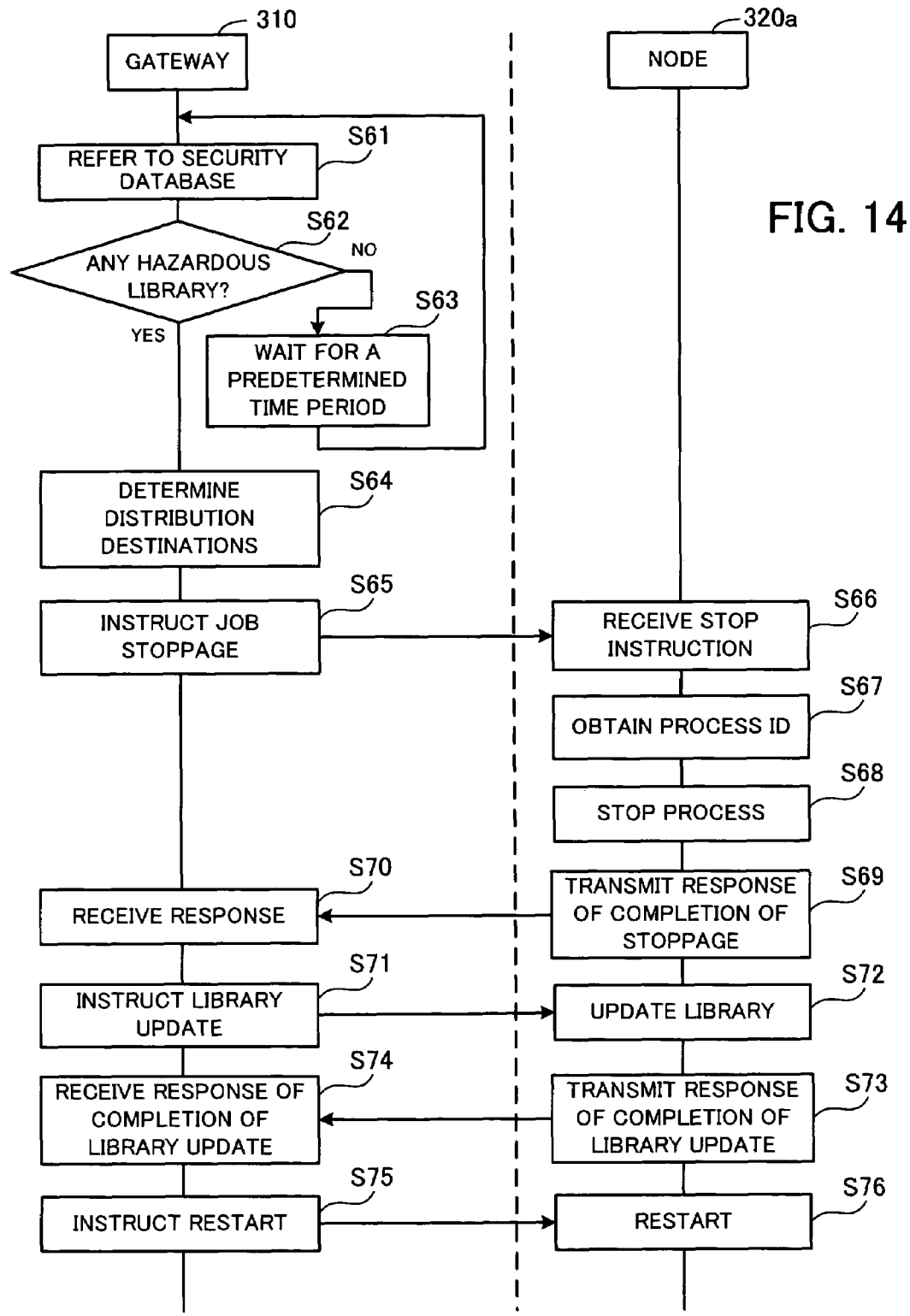
FIG. 14 is a sequence diagram showing a process for updating a library, which is carried out when a security defect is detected in a library.

FIG. 14 is a sequence diagram showing the process for updating a library, which is carried out when a security defect is detected in a library. Hereinafter, a description will be given of the process shown in FIG. 14, following the order of step numbers.

[Step S61] The vulnerable library information-obtaining section 317 of the gateway 310 refers to the security database 410 and obtains the library names and the versions of libraries whose risks are registered to be "Great". Then, the vulnerable library information-obtaining section 317 passes a list of the obtained library names and versions to the submission destination-determining section 318.

[Step S62] The submission destination-determining section 318 determines whether or not there is a hazardous library. More specifically, the submission destination-determining section 318 determines whether or not any of the sets of the library names and the versions included in the list of the library names and versions obtained in the step S61 are registered in the service library management database 311. If at least one of the sets is registered, it is determined that there is a hazardous library. In this case, the present process proceeds to a step S64, whereas if there is no hazardous library, the present process proceeds to a step S63.

[Step S63] The vulnerable library information-obtaining section 317 waits for a predetermined time period, and then the present process proceeds to the step S61.

[Step S64] The submission destination-determining section 318 determines submission destination nodes to which has been submitted a program for executing the hazardous library. More specifically, the submission destination-determining section 318 obtains program names corresponding to the library names and versions obtained in the step S61, from the service library management database 311. Then, the submission destination-determining section 318 refers to the job submission destination management database 312 to detect any entry of the obtained program names.

Subsequently, the submission destination-determining section 318 extracts an IP address of each of any detected entry of the program names from the job submission destination management database 312. Further, the submission destination-determining section 318 passes a set of the extracted program name and IP addresses to the forcible job stop section 319 and the library update-instructing section 310a.

[Step S65] The forcible job stop section 319 instructs the nodes executing the program using the hazardous library to stop the jobs performed based on the program. When there are plurality of concerned nodes, the forcible job stop section 319 instructs the nodes to stop their jobs.

[Step S66] In the node 320a, the job management section 321 receives the job stop instruction.

[Step S67] The job management section 321 obtains the process ID of a process corresponding to the program name designated by the job stop instruction.

[Step S68] The job management section 321 designates the process ID obtained in the step S67 to issue a process-stopping request to the OS 322. The OS 322 forcibly stops the process corresponding to the designated process ID according to the stopping request.

[Step S69] The job management section 321 confirms stoppage of the process, and then transmits a response of completion of the stoppage to the gateway 310.

[Step S70] Upon reception of the response from the node 320a, the forcible job stop section 319 of the gateway 310 delivers a notification that preparation for updating the library has been completed, to the library update-instructing section 310a.

[Step S71] The library update-instructing section 310a instructs the node 320a to perform library update, by designating identification information for identifying the library to be updated.

[Step S72] Upon reception of the update instruction, the library update section 326 obtains a latest version of the library from the library database 420, and updates the library to be updated to the latest version.

[Step S73] After completion of the updating of the library, the library update section 326 returns a response of completion of the updating of the library to the gateway 310.

[Step S74] Upon reception of the response of completion of the updating of the library, the library update-instructing section 310a of the gateway 310 sends a notification that elimination of the risk of the library has been completed, to the forcible job stop section 319.

[Step S75] Upon reception of the notification from the library update-instructing section 310a, the forcible job stop section 319 transmits an instruction for restarting the job to the node 320a.

[Step S76] The job management section 321 of the node 320a restarts the job. More specifically, the job management section 321 issues a request for restarting the program 41 to the OS 322. Then, a job executing process 325 is regenerated, and the program 41 is executed by the job executing process 325.

As described hereinabove, when the job executing process 325 executing a job using a hazardous library is forcibly and stopped, the job can be restarted after the library is updated to a version free from problems. This makes it possible to shorten a time period over which execution of the job is interrupted, thereby making it possible to suppress the degradation of processing efficiency of the whole grid system when a hazardous library is found.

It should be noted that the processing functions described above can be realized by a computer. To this end, there is provided a program describing the details of processing of the functions which the gateway and the nodes should have. By executing the program on the computer, the processing functions described above are realized on the computer. The program describing the details of processing can be recorded in a computer-readable recording medium. The computer-readable recording medium includes a magnetic recording device, an optical disk, a magneto-optical recording medium, and a semiconductor memory. The magnetic recording device includes a hard disk drive (HDD), a flexible disk (FD), and a magnetic tape. The optical disk includes a DVD (Digital Versatile Disk), a DVD-RAM (Random Access Memory), and a CD-ROM (Compact Disk Read Only Memory), and a CD-R (Recordable)/RW (ReWritable). Further, the magneto-optical recording medium includes an MO (Magneto-Optical disk).

To make the program available on the market, portable recording media, such as DVD and CD-ROM, which store the program, are sold. Further, the program can be stored in a storage device of a server computer connected to a network, and transferred from the server computer to another computer via the network.

When the program is executed by a computer, the program stored e.g. in a portable recording medium or transferred from the server computer is stored into a storage device of the computer. Then, the computer reads the program from the storage device of its own and executes processing based on the program. The computer can also read the program directly from the portable recording medium and execute processing based on the program. Further, the computer may also execute processing based on a program which is transferred from the server computer whenever the processing is to be carried out.

In the present invention, identification information for identifying libraries, which are called by a job program executed according to submission of a job, is registered in advance in a database, and when a security defect is found in one of the libraries, nodes to which the job has been submitted are instructed to stop processes for executing the job program. As a result, when a hazardous library is found, even if a job program using the library is being executed on a large number of nodes, it is possible to instantly make an emergency stop of execution of the job program.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer-readable recording medium storing a security management program for use by a gateway computer to perform security management of jobs submitted to nodes on a network, the security management program, when executed on the gateway computer, causing the gateway computer to function as a system comprising:

a service library management database to store associations between a job program describing processes of a job, and link libraries called by the job program;

a job submission destination management database to store associations between the job program, and job submission destination nodes to which the job has been submitted;

a job execution request-obtaining unit to receive input of a job execution request whereby the job program is obtained;

a service library-determining unit to analyze the job program obtained by said job execution request-obtaining unit, to determine the link libraries to be called by the job program, and to register associations between identification information for identifying the job program and identification information for identifying the link libraries in said service library management database;

a job submission unit to determine submission destination nodes for the job program obtained by said job execution request-obtaining unit, to register identification information identifying the submission destination nodes to which the obtained job program will be transmitted for execution thereon and the identification information identifying the job program in association with each other in said job submission destination management database, and to transmit the job program to the submission destination nodes for causing the submission destination nodes to execute the job program;

a submission destination-determining unit, operable once identification information to identify a vulnerable library having a security defect is input, to refer to said service library management database to thereby obtain the identification information for identifying the job program corresponding to the identification information for identifying the vulnerable library, and to refer to said job submission destination management database to thereby obtain the identification information for identifying the submission destination nodes corresponding to the obtained identification information for identifying the job program;

a forcible job stop unit to instruct the submission destination nodes to forcibly stop processes that are executing the job program using the identified vulnerable library, based on the identification information identifying the job program and the identification information identifying the submission destination nodes, which are obtained by said submission destination-determining; and a vulnerable library information-obtaining unit to output only identification information for identifying a vulnerable library having a higher degree of risk than a predetermined degree of risk to said submission destination-determining unit, wherein degrees of risk indicative of levels of hazard to be caused by vulnerable libraries are set in a security database.

2. The computer-readable recording medium according to claim 1, wherein the vulnerable library information-obtaining unit to periodically search the security database in which is registered identification information for identifying a vulnerable library whenever a security defect is found in a library, to thereby obtain the identification information for identifying the vulnerable library, and outputting the obtained information to said submission destination-determining unit.

3. The computer-readable recording medium according to claim 2, wherein said vulnerable library information-obtaining unit periodically searches the security database in which is registered identification information for identifying a vulnerable library according to a request for obtaining information on a vulnerable library, the request being issued from said service library-determining unit, to thereby obtain the identification information for identifying the vulnerable library, and passes the information to said service library-determining unit,
- wherein after determining the link libraries, said service library-determining unit issues the request for obtaining information on a vulnerable library to said vulnerable library information-obtaining unit, receives the identification information for identifying the vulnerable library from said vulnerable library information-obtaining unit, and determines whether or not there exists a link library whose identification information matches the identification information for identifying the vulnerable library, and
- wherein said job submission unit causes the submission destination nodes to execute the job program only when said service library-determining unit has determined that there is no link library whose identification information matches the identification information for identifying vulnerable libraries.

4. The computer-readable recording medium according to claim 3, wherein degrees of risk indicative of levels of hazard to be caused by vulnerable libraries are set in the security database, and
- wherein said vulnerable library information-obtaining unit outputs only identification information for identifying a vulnerable library set to have a higher degree of risk than a first predetermined degree of risk, to said submission destination-determining unit, and passes only identification information for identifying a vulnerable library set to have a higher degree of risk than a second predetermined degree of risk lower than the first predetermined degree of risk, to said service library-determining unit.

5. The computer-readable recording medium according to claim 1, wherein the system further comprises a library update-instructing unit to transmit a library update instruction for updating the vulnerable library to a latest version thereof, to the submission destination nodes.

6. The computer-readable recording medium according to claim 5, wherein said forcible job stop unit causes the submission destination nodes to start the job program after the vulnerable library in the submission destination nodes has been updated.

7. The computer-readable recording medium according to claim 1, wherein the link libraries determined by said service library-determining unit include those incorporated in the job program itself and those stored in other files separately from the job program.

8. The computer-readable recording medium according to claim 1, wherein said service library-determining unit registers library names and versions of the link libraries as the identification information for identifying link libraries, in said service library management database, and wherein said submission destination-determining unit receives a library name and a version of the vulnerable library as the identification information for identifying the vulnerable library.

9. A security management system for carrying out security management of jobs submitted to nodes on a network, the security management system comprising:
- a processor; memory;
- a service library management database to store associations between a job program describing processes of a job, and link libraries called by the job program;
- a job submission destination management database to store associations between the job program, and job submission destination nodes to which the job has been submitted;
- a job execution request-obtaining unit to receive input of a job execution request whereby the job program is obtained;
- a service library-determining unit to analyze the job program obtained by said job execution request-obtaining unit, determining the link libraries to be called by the job program, and registering associations between identification information for identifying the job program and identification information for identifying the link libraries in said service library management database;
- a job submission unit to determine submission destination nodes for the job program obtained by said job execution request-obtaining unit, register identification information identifying the submission destination nodes to which the obtained job program will be transmitted for execution thereon and the identification information identifying the job program in association with each other in said job submission destination management database, and transmit the job program to the submission destination nodes for causing the submission destination nodes to execute the job program;
- a submission destination-determining unit, operable when identification information, to identify a vulnerable library having a security defect is input, to refer to said service library management database to thereby obtain the identification information for identifying the job program corresponding to the identification information for identifying the vulnerable library, and refer to said job submission destination management database to thereby obtain the identification information for identifying the submission destination nodes corresponding to the obtained identification information for identifying the job program;
- a forcible job stop unit to instruct the submission destination nodes to forcibly stop processes that are executing the job program using the identified vulnerable library, based on the identification information identifying the job program and the identification information identifying the submission destination nodes, which are obtained by said submission destination-determining unit; and
- a vulnerable library information-obtaining unit to output only identification information for identifying a vulnerable library having a higher degree of risk than a predetermined degree of risk to said submission destination-determining unit, wherein degrees of risk indicative of levels of hazard to be caused by vulnerable libraries are set in a security database.

10. A method for use by a gateway computer to perform security management of jobs submitted to nodes on a network, the method comprising:
- receiving input of a job execution request whereby the job program is obtained;
- analyzing the job program obtained in said job execution request-obtaining step, determining the link libraries to be called by the job program, and registering associations between identification information for identifying the job program and identification information for identifying the link libraries in a service library management database;

determining submission destination nodes which are to be caused to execute the job program received;

registering identification information identifying the submission destination nodes to which the obtained job program will be transmitted for execution thereon and the identification information identifying the job program in association with each other in a job submission destination management database;

transmitting the job program to the submission destination nodes for causing the submission destination nodes to execute the job program;

referring, when identification information for identifying a vulnerable library having a security defect is input, to the service library management database to thereby obtain the identification information for identifying the job program corresponding to the identification information for identifying the vulnerable library, and referring to the job submission destination management database to thereby obtain the identification information for identifying the submission destination nodes corresponding to the obtained identification information for identifying the job program;

instructing the submission destination nodes to forcibly stop processes that are executing the job program using the identified vulnerable library, based on the identification information identifying the job program and the identification information identifying the submission destination nodes, which are obtained in said referring;

outputting only identification information for identifying a vulnerable library having a higher degree of risk than a predetermined degree of risk, wherein degrees of risk indicative of levels of levels of hazard to be caused by vulnerable libraries are set in a security database.

* * * * *